March 27, 1956     R. H. HIEGER     2,739,400

AUTOMOBILE EMBLEM ENSEMBLE

Filed March 26, 1952

INVENTOR.
ROBERT H. HIEGER
BY Gregory S. Dolgorukov

ATTORNEY.

United States Patent Office 2,739,400
Patented Mar. 27, 1956

2,739,400
AUTOMOBILE EMBLEM ENSEMBLE

Robert H. Hieger, Detroit, Mich.

Application March 26, 1952, Serial No. 278,599

3 Claims. (Cl. 40—2)

This invention relates to an ornamental base for automobile ornaments. The present application is a continuation-in-part of my co-pending application, Serial No. 188,422 filed October 4, 1950, for Retainer for Automobile Emblem and the Like.

It is well appreciated in the art that an automobile emblem or trade-mark that is usually attached to the engine hood at the front thereof or to the rear deck lid of an automobile, constitutes a very important part of automobile styling. Great amount of inventive effort is directed to designing such emblems and means for attaching them to automobiles. In fact, there exist at the present time very strenuous competition among automobile manufacturers, directed to designing the most striking emblem that is sufficiently distinctive to identify the manufacturer and also to give indication of the type of engine or other mechanical features of the automobile. There are a number of serious difficulties in providing such emblems and the search for improved construction of such emblems continues.

It should be appreciated that in order to be distinctive such emblem must be sufficiently large to be distinguishable at a considerable distance, such as 15 or even 20 feet, and yet do not have constructional disadvantages resulting from such size. Automobile emblems are now made almost universally out of plastics, with striking coloring effect produced by hot fusing ornamental foil onto the embossed surface of an emblem. It is well understood, however, that plastic material suitable for such molding and processes are relatively brittle and if made in the form of a relatively large panel would crack either because of aging of the plastic material or due to even a slight impact or blow, accidental or intentional. The prior practice of producing automobile emblems by die casting operations has been virtually discontinued. Moreover, even die cast emblem would not be suitable if made in the form of a plate of relatively large area, as requiring considerable amount of material, and being brittle.

In view of the above, the desired effect is now attained in some instances by grouping several emblems and ornamental designs, which are, in effect, separate emblems and are separately attachable and detachable. Such expedient is costly and has now become so universal as to provide very little distinctiveness in emblem ensembles.

One of the objects of the present invention is to provide an improved ornamental base for an automobile emblem or trade-mark, whereby the above difficulties and disadvantages are overcome and virtually eliminated.

Another object of the present invention is to provide an improved one-piece ornamental base for an automobile emblem which is adapted to receive a plastic or similar trade-mark and to supplement the same ornamentally and structurally, and thus to provide a construction enabling a designer to produce an emblem ensemble of relatively large size and of a distinctive outline.

A further object of the present invention is to provide an improved ornamental base of the character specified in the preceding paragraph, which base is susceptible of being manufactured from sheet metal by stamping operations and yet give massive appearance.

A still further object of the present invention is to provide a sheet metal base for automobile emblem, means being provided whereby such base fits tightly against the curved cover sheet of the automobile body, leaving no unsightly clearance spaces.

A still further object of the present invention is to provide an improved base for automobile emblem, which is made from relatively thin sheet metal and yet is relatively rigid in construction.

A still further object of the present invention is to provide greatly simplified but reliable means for attaching the entire emblem ensemble to the automobile body.

A still further object of the present invention is to provide an improved automobile emblem ensemble including a stamped sheet metal ornamental base and a plastic trade-mark including emblem, improved attaching means being provided whereby both the emblem and the base are securely attached to an automobile.

A still further object of the present invention is to provide an improved base for an existing automobile emblem which base is adapted to receive and to supplement such emblem, and is also adapted to be attached to the respective automobile with the same attaching means as the original emblem.

It is an added object of the present invention to provide an improved base for automobile emblem or ornament, which is simple in construction, dependable in use and inexpensive to manufacture.

Further objects and advantages of this invention will be apparent from the following description and appended claims, reference being had to the accompanying drawings forming a part of this specification, wherein like reference characters designate corresponding parts in the several views.

It is to be understood that the invention is not limited in its application to the details of construction and arrangement of parts illustrated in the accompanying drawings, since the invention is capable of other embodiments and of being practiced or carried out in various ways. Also it is to be understood that the phraseology and terminology employed herein is for the purpose of description and not of limitation.

Particularly it will be understood that the term "cover sheet of an automobile" as herein used refers to the painted sheet of metal forming the outline of the automobile body both at the rear thereof and in the engine hood part thereof, and does not include parts of the automobile such as bumpers, or license plate holders attached thereto.

In accordance with the invention I completely discard the conventional practice of producing an automobile emblem ensemble by grouping several emblems together, such for instance as grouping together a trade-mark including emblem and a design designating the use in the automobile of a V-type engine, or the latter design together with the trade-mark word and the like. I provide an ensemble which comprises a sheet metal base providing one portion of the distinctive ornamental design and adapted to receive and to support a trade-mark including emblem which may be made of plastic, and preferably attach the entire ensemble with the aid of common attaching means. The sheet metal base may be polished and provided with a finish such as a suitable type of metal plating, or be painted the same color as the cover sheet of the automobile, or a distinctively different color.

My improved emblem ensemble may be installed in original equipment, which is to say, automobiles as they are produced at the factory, or be installed in already existing automobiles. In the latter case, the sheet metal base is adapted to receive the existing trade-mark-containing emblem and has apertures adapted to pass the attaching means provided on the emblem, whereby both the base and the emblem are attached to the automobile cover sheet with the aid of the attaching means already provided on the emblem.

Figure 1:
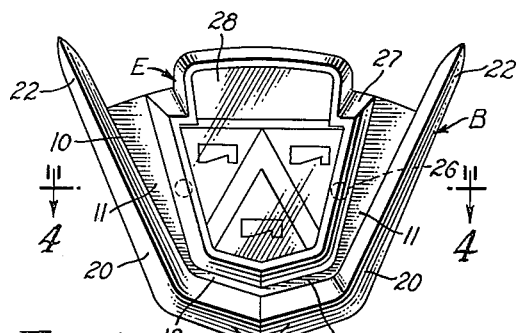
Fig. 1 is a front view of the emblem ensemble embodying the present invention.
Figure 3:
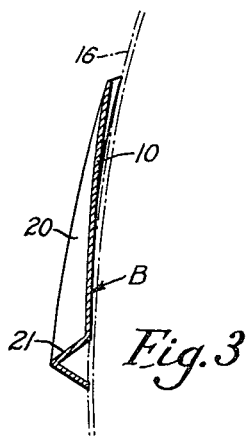
Fig. 3 is a vertical sectional view taken in the direction of the arrows on the section plane passing through the line 3—3 of Fig. 2.
Figure 2:
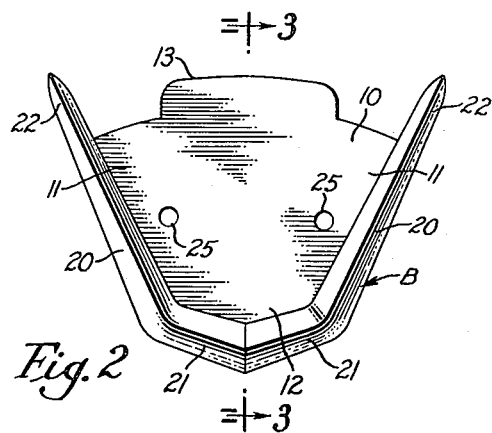
Fig. 2 shows the base for the ensemble shown in Fig. 1.
Figure 4:
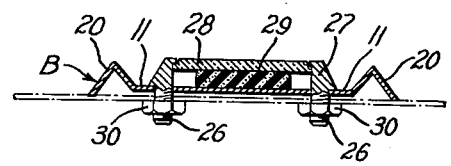
Fig. 4 is a transverse sectional view of the ensemble shown in Fig. 1, taken in the direction of the arrows on the section plane passing through the line 4—4 of Fig. 1.

In the drawings there is shown, by way of example, two automobile emblem ensembles embodying the present invention. Referring particularly to Figs. 1–4, the ensemble illustrated therein comprises a base generally indicated by the character B, and an emblem containing the trade-mark and generally designated by the character E. The base B is made of suitable sheet metal, such as stainless steel, and comprises a flat shield portion 10 adapted to receive the emblem E and to provide substantial marginal side area 11 and bottom marginal area 12 at the sides and bottom of the emblem. The upper edge 13 of the shield portion 10 is preferably shaped to follow the outline of the upper edge of the emblem E and to blend into the design of V-shaped ornamental bead having side bars 20, bottom bars 21, and upward projections 22. The bead is made of an angular cross section as is shown in Figs. 3 and 4, whereby it stiffens the base and supplements the emblem E with a V-shaped design indicating the type of the engine used in the automobile, and giving the shield a more massive appearance.

The side bars of the bead are of broken line outline, thereby shortening the downward extent of the ensemble, decreasing the bottom marginal areas 12 and producing a more balanced design of the ensemble. The projections 22 extend beyond the upper edge of the shield 10 in order to make the outline of the bead more clearly distinguishable and more striking.

Suitable attaching means are provided, whereby the entire ensemble is held tightly against the cover sheet 16 of the automobile. In the present embodiment of the invention utilizing the emblem of one existing automobile, the attaching means provided on the emblem are utilized to hold both the emblem and the base to the cover sheet. Accordingly, the shield portion 10 is provided with two holes 25 registering with similar holes provided in the cover sheet and adapted to pass bolts 26 of the metal frame 27. The frame 27 is adapted to retain the plastic piece 28. A sponge rubber piece 29 is placed under the plastic piece 28 in order to maintain the same tightly in position without the danger of cracking the plastic piece in the attempts to tighten the same in place.

It will now be understood in view of the foregoing that my improved emblem ensemble may be provided on a new automobile in the factory, or may be installed in automobiles already on the road. For the latter purpose, the existing emblem is removed from the automobile, and the base B is placed against the cover sheet of the automobile. Thereupon the bolts 26 are passed through the holes 25 and the registering similar holes on the cover sheet of the automobile, and the nuts 30 or similar retainers are placed on the bolts 26 from the inner side of the cover sheet.

Means are provided whereby the base B fits against the cover sheet of an automobile tightly, eliminating the possibility of rattling and yet not requiring unreasonably strong attachment to such sheet. This result is attained by imparting to the base a slightly greater curvature than that of the sheet, to the curvature of which the bottom of the base is generally made to conform. Thus, when the base is placed against the cover sheet, its edges contact the sheet first, while its middle stands away from said sheet for some suitable distance, such as $1/16''$. When the nuts 30 are tightened on the bolts 26, the middle of the base is drawn closer to the cover sheet, whereby the peripheral edges of the base are resiliently pressed against the cover sheet.

Figure 5:
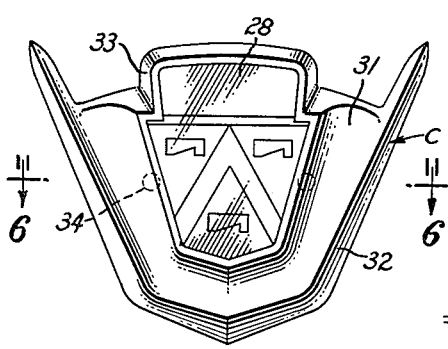
Fig. 5 is a front view of an emblem ensemble including the base of a modified construction.
Figure 6:
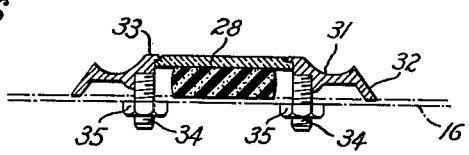
Fig. 6 is a transverse sectional view taken in the direction of the arrows on the section plane passing through line 6—6 of Fig. 5.

Figs. 5 and 6 illustrate an emblem having base C of a modified construction. The base illustrated in said figures may be of a cast construction, and it includes a shield portion 31 and bead 32, similar in outline and appearance to those of the base B, and an aperture provided at its edges with a frame 33 adapted to hold the plastic base 28. Studs 34 are provided on the base C at the frame 33 thereof to register with the holes in the cover sheet 16. Thus, the entire emblem ensemble may be installed on an automobile in a manner similar to that described with respect to the ensemble of Figs. 1–4, and tightened with the aid of nuts or similar connectors 35.

The construction of Figs. 5 and 6 may have particular advantages for installation on original equipment in order to save the expense of manufacturing a separate frame such as frame 27 shown in the drawings.

It will be understood, however, that the emblem of Figs. 5 and 6 may also be made of sheet metal construction with the studs 34 butt welded to the steel stamping forming the base, or by securing them to the base in any other suitable manner.

By virtue of the construction disclosed above, the objects of the present invention listed above and numerous other advantages are attained.

I claim:

1. A one-piece ornamental base for an automobile emblem, said base comprising a shield stamped from sheet stainless steel and having configuration generally similar to that of the emblem but of larger size to provide substantial marginal areas on sides and bottom thereof, a V-shaped ornamental bead stamped along the side and bottom edges of said marginal areas and having tops of its legs protruding upwardly therefrom to stiffen said shield and to provide an additional ornament supplementing said emblem, said base being shaped to conform substantially to the curvature of a predetermined portion of the cover sheet of the automobile body and having curvature of shorter radii than said cover sheet.

2. A one-piece ornamental base for an automobile emblem, said base comprising a shield stamped from sheet stainless steel and having configuration generally similar to that of the emblem but of larger size to provide marginal area long the edges of the emblem, a V-shaped ornamental bead stamped along the side and the bottom edges of said marginal area and having tops of said legs protruding upwardly therefrom to stiffen said shield and to provide an additional ornament supplementing said emblem, the lower portions of the legs of said V-shaped bead being broken to increase the angle therebetween, said base being shaped throughout its area to conform substantially to the curvature of a predetermined portion of the cover sheet of the automobile body, but having curvature of shorter radii than said cover sheet.

3. A one-piece ornamental base for an automobile emblem, said base comprising a shield stamped from relatively thin sheet of resilient material and having configuration generally similar to that of the emblem but of larger size to provide substantial marginal areas on sides and bottom thereof, a V-shaped ornamental bead of angular cross-section stamped along the edges of said marginal areas and having broken legs with their lower portions framing the lower edges of the shield and their upper portions framing the side edges thereof to stiffen said shield and to provide an additional ornament supplementing said emblem with the ends of said upper portions protruding upwardly from the shield, said base conforming substantially to the curvature of a predetermined portion of the cover sheet of the automobile body, with the curvature of the base being of smaller radii than that of the cover sheet to ensure tightness of the base thereon, said shield being provided with a plurality of holes registering with similar holes in the cover sheet and adapted to pass the bolts carried by said emblem.

References Cited in the file of this patent

UNITED STATES PATENTS

| | | |
|---|---|---|
| 222,580 | Fest | Dec. 16, 1879 |
| 1,709,007 | Clemmons | Apr. 16, 1929 |
| 1,793,804 | Hyatt | Feb. 24, 1931 |
| 1,906,504 | Allison | May 2, 1933 |
| 1,930,783 | Watson | Oct. 17, 1933 |
| 2,113,871 | Bozung | Apr. 12, 1938 |

FOREIGN PATENTS

| | | |
|---|---|---|
| 48,069 | Norway | June 23, 1930 |